Patented Apr. 13, 1954

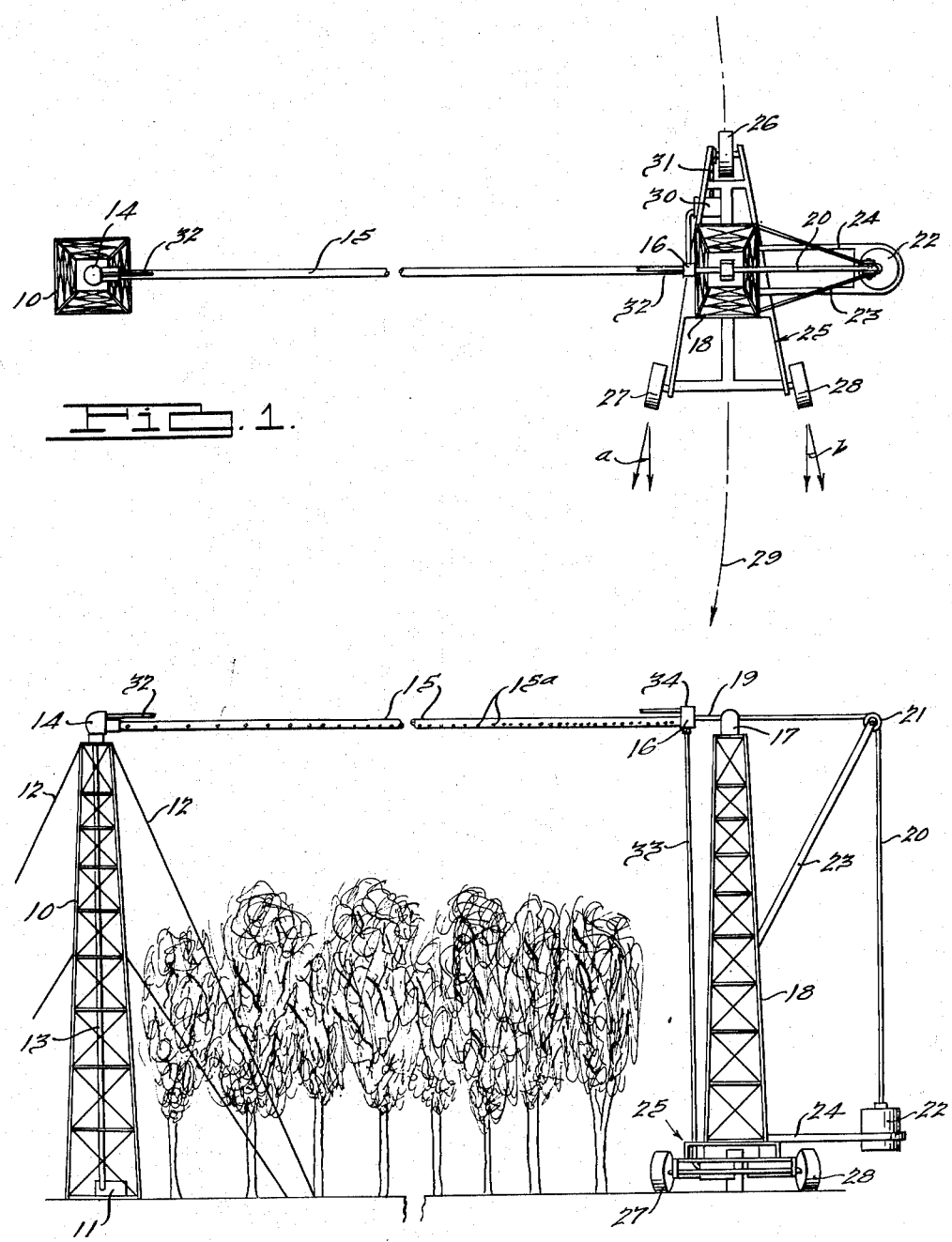

2,675,269

UNITED STATES PATENT OFFICE 2,675,269

OVERHEAD SPRINKLING APPARATUS

Thure E. Rosene, Detroit, Mich.

Application August 18, 1950, Serial No. 180,248

7 Claims. (Cl. 299—54)

This invention relates to a sprinkling apparatus and in particular to an overhead sprinkler suitable for use in areas where surface irrigation is impracticable or which are inaccessible to truck-borne watering equipment, as for example forest areas or densely planted orchard or nursery areas.

An object of the invention is to provide a sprinkling apparatus of the foregoing nature comprising an elevated sprinkling pipe spanning and supported by a tiltable traveling support or tower and a central support or tower so as to swing about the latter as a radius vector, the tension in the pipe tending to tilt the traveling tower radially inward toward the central tower and being counterbalanced by a weight carried by the traveling tower tending to tilt the latter radially outward, the traveling tower being thereby guided generally in a desired curved path about the central tower by means of ground engaging wheels operatively mounted on the traveling tower so as to steer the latter inward of said desired curved path when the traveling tower is tilted radially inward and to steer that tower outward of said path when that tower is tilted radially outward. Thus should the traveling tower stray outward from the desired curved path, it will be tilted inward by the sprinkling pipe, causing the traveling tower to steer inward toward the central tower, and to be returned to the untilted condition by the counterbalancing weight. When the traveling tower strays inward of the desired curved path, the pipe will permit the traveling tower to tilt radially outward by reason of the counterbalancing weight, whereupon the traveling tower will steer outward. As a result, the traveling tower will move in a generally circular path about the central tower.

In a preferred construction, some of the wheels of the tiltable traveling tower are arranged along the side thereof on the inside of the desired curved path of movement and are mounted to steer that tower inward of said path. Some of the wheels of the traveling tower are also arranged along the side thereof on the outside of the curved path and are mounted to steer that tower outward of said path. Thus as the traveling tower is tilted radially inward as aforesaid, its outer side will be elevated and its weight will be carried primarily by the wheels on the inside of the curve, causing the tower to turn inward toward the central tower. When the traveling tower is tilted outward, the inner side thereof will be elevated and the weight of the tower will be carried substantially by the wheels on the outside of the curve, causing that tower to steer outward from the central tower.

The traveling tower may be powered by any suitable means, as for example electricity if available, gasoline motor, or the like. In a preferred application of the present invention, a simple water pressure operated motor is employed, since water pressure will necessarily be available if the sprinkler is to be operated. The water pressure for operation of the motor is thus readily carried by a motor supply pipe spanning the towers generally side by side with the sprinkling pipe, and is distributed under pressure from any suitable source radially through both pipes from the central tower. The central tower may also be mounted on wheels to permit its portage from one location to another, in which case it is suitably supported by guy wires to prevent its tipping.

Other objects of this invention will appear in the following description and appended claims, reference being had to the accompanying drawings forming a part of this specification wherein like reference characters designate corresponding parts in the several views.

Fig. 1 is a fragmentary plan view of a sprinkling apparatus embodying the present invention.

Fig. 2 is a fragmentary elevation of the apparatus of Fig. 1.

It is to be understood that the present invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by the way of example comprising a central tower 10 which may be fixed at a suitable source of water pressure 11, or may be portable from place to place as desired. In the latter event the tower 10 will be suitably supported by guy wires 12 as shown and may be mounted on wheels if desired to facilitate portability.

The water supply 11 may comprise any suitable water tap, including a pressure booster pump if necessary, and is connected with a supply header 13 supported within the framework of the tower 10 and extending above the top thereof.

Connected to the upper end of the header 13 by means of swivel coupling 14 is a suitable sprinkling pipe 15, which may be of conventional construction. In the present instance the pipe 15 is provided with a plurality of small water outlets 15a spaced along its length. Where the pipe 15 is of appreciable length, as in the usual instance, the outlets 15a will be larger and more closely spaced near its outer end to compensate for pressure drop and the increased area swept over by the outer portions of the pipe.

Preferably the pipe 15 comprises a number of conveniently handled lengths of lightweight aluminum alloy tubing, connected in series to complete the required length, which may feasibly be at least two hundred feet. With such a length, a half inch inside diameter is satisfactory for ordinary sprinkling purposes, the volume of delivery being controlled by regulating the supply pressure. In order to minimize weight, the small diameter pipe operated at higher pressure is usually preferred. The outer end of the sprinkling pipe 15 terminates at a cap 16 which is connected to a boss 17 at the top of a traveling tower 18 by means of a link 19.

In order to counterbalance the tension in the pipe 15, a cable 20 passing in the present instance over a pulley 21 is secured at one end to the boss 17 and at the other end to a counterbalancing weight 22. The pulley 21 is supported at the end of a fixed boom 23 extending angularly upward from the tower 18 and disposed to suspend the weight 22 at a location spaced outward of the tower 18 on the side thereof opposite the pipe 15. Swinging of the weight 22 is prevented by a rigid support 24 which extends freely around the weight 22 so as to avoid vertical support thereto and is rigidly secured to the tower near the base 25 thereof.

The base 25 of the tower 18 comprises a three-wheeled truck or triangular frame having a single rear driving wheel 26 journaled at the apex thereof and a pair of laterally spaced front wheels 27 and 28 journaled at the sides thereof on the inside and outside respectively of a generally circular path of movement about the tower 10, indicated by the arrow 29, Fig. 1. As will be apparent from the following discussion, the curvature of the path 29 has a radius approximately equal to the length of the pipe 15 and is considerably exaggerated in the drawing for the purpose of illustration.

The rear wheel 26 lies in a vertical plane substantially tangent to the circular path 29. In order to maintain the truck 25 substantially on the path 29, the front wheel 27 is mounted to steer inward from the curved path 29 at a fixed angle $a$ and the wheel 28 is mounted to steer outward from said path 29 at a fixed angle $b$. It is thus apparent that as the truck 25 strays outward from the path 29, the tension in the radial pipe 15 will pull the top of the tower 18 radially inward, raising the wheel 28 from the ground and throwing the load of the truck 25 on the wheels 26 and 27. As a result the truck 25 will turn inward of the path 29 in a curved path of smaller radius until the tower 18 straightens. In the event that the truck 25 should stray inward from the path 29, slackening of the pipe 15 will permit the counterbalancing weight 22 to tilt the truck radially outward. As a result, the wheel 27 will be elevated from the ground. The truck will then ride on the wheels 26 and 28 and turn outward of the path 29. Very little tilting of the truck 25 will throw the load thereof to one side or the other and effect the steering action, so that the resultant movement of the truck 25 will conform closely to the desired circular path 29.

The driving wheel 26 is powered in the present instance by a water pressure operated motor 30 suitably connected with the wheel 26 as for example by a chain and sprocket drive indicated generally by the numeral 31. The motor and drive mechanism may be conventional and are accordingly not discussed in detail herein. A simple reciprocating type water pressure operated motor having few parts to get out of order has proven satisfactory. Power for the motor 30 may be supplied directly from the pipe 15, but in order to minimize pressure in that pipe, a separate motor supply pipe 32 of small bore extending between the towers 10 and 18 side by side with the pipe 15 is preferred. The inner end of the pipe 32 is connected to the supply header 13 also by means of the swivel coupling 14 and is connected by means of an L-coupling 34, integral with the cap 16, to a downward and rearward pipe extension 33 which is operatively connected at its lower end to the motor 30. Like the pipe 15, the pipe 32 preferably comprises a number of conveniently handled short lengths of aluminum alloy tubing connected in series. Inasmuch as the power requirement of the motor 30 is slight, the truck 25 usually requiring one to several days to complete a trip around the tower 10, an internal diameter of approximately one-quarter inch or less for the pipe 32 has proven satisfactory.

By the structure described, it is apparent that it is only necessary to provide a comparatively clear circular path 29 about the tower 10 and the sprinkling apparatus will operate automatically thereafter, upon being connected with the water supply 11, without interference from trees or other plants to be watered within the circular path. The towers 10 and 18 will of course be sufficiently high to suspend the pipe 15 above the trees or plants to be watered. In addition to supplying water, the apparatus is also useful for spraying nutrient solutions, insecticidal solutions, and the like. Likewise the apparatus is particularly useful for spraying orchards and the like to prevent damage by freezing during frosty nights.

I claim:

1. In a sprinkling apparatus, a central support, a traveling tiltable support, an elevated sprinkling pipe connectible with a source of pressurized water, said sprinkling pipe spanning and being supported under tension by said supports for swinging generally as a radius vector upon movement of the traveling support generally in a desired curved path about the central support, means carried by the traveling support tending to tilt the same radially outward of said path to counterbalance the tension in the sprinkling pipe tending to tilt the traveling support radially inward, means to guide said traveling support outward of said path comprising an outward ground engaging direction control wheel journaled on the traveling support at the side thereof outward of said path, thereby to assume an increased proportion of the weight of the traveling support upon outward tilting thereof, said outward wheel being biased to steer the traveling support outward of said path, and means to guide said traveling support inward of said path comprising an inward ground engaging direction control wheel journaled on the traveling support at the side thereof inward of said path, thereby to assume an increased proportion of the weight of the traveling support upon inward tilting thereof, said inward wheel being biased to steer the traveling support inward of said path.

2. In a sprinkling apparatus, a central support, a power driven traveling tiltable support, an elevated sprinkling pipe connectible with a source of pressurized water, said sprinkling pipe spanning and being supported under tension by said supports for swinging generally as a radius vector upon movement of the traveling support generally in a desired curved path about the central support, means carried by the traveling support tending to tilt the same radially outward of said path to counterbalance the tension in the sprinkling pipe tending to tilt the traveling support radially inward, a forward ground engaging direction control wheel journaled on the traveling support on the side thereof outward of said path and directed outward of said path, and a forward ground engaging direction control wheel journaled on the traveling support on the side thereof inward of said path and directed inward of said path.

3. In a sprinkling apparatus, a central support, a traveling tiltable support, an elevated sprinkling pipe connectible with a source of pressurized water, said sprinkling pipe spanning and being supported under tension by said supports for swinging generally as a radius vector upon movement of the traveling support generally in a desired curved path about the central support, a water pressure operated motor carried by said traveling support to propel the same, a water pressure supply pipe also spanning said supports generally in parallelism with said sprinkling pipe and being operatively connected with said motor, means carried by the traveling support tending to tilt the same radially outward to counterbalance the tension in the sprinkling pipe tending to tilt the traveling support radially inward, means to guide said traveling support outward of said path comprising an outward ground engaging direction control wheel journaled on the traveling support at the side thereof outward of said path, thereby to assume an increased proportion of the weight of the traveling support upon outward tilting thereof, said outward wheel being biased to steer the traveling support outward of said path, and means to guide said traveling support inward of said path comprising an inward ground engaging direction control wheel journaled on the traveling support at the side thereof inward of said path, thereby to assume an increased proportion of the weight of the traveling support upon inward tilting thereof, said inward wheel being biased to steer the traveling support inward of said path.

4. In a sprinkling apparatus, a central support, a power driven traveling tiltable support, an elevated sprinkling pipe connectible with a source of pressurized water, said sprinkling pipe spanning and being supported under tension by said supports for swinging generally as a radius vector upon movement of the traveling support generally in a desired curved path about the central support, a counterbalancing weight carried by said traveling support at a location spaced radially outward from said base tending to tilt the traveling support radially outward to counterbalance the tension of said pipe, a forward ground engaging direction control wheel journaled on the traveling support on the side thereof outward of said path and directed to roll outward of said path, thereby to guide the traveling support outward of said path upon outward tilting of said traveling support, and a forward ground engaging direction control wheel journaled on the traveling support on the side thereof inward of said path and directed to roll inward of said path, thereby to guide the traveling support inward of said path upon inward tilting of the traveling support.

5. In a sprinkling apparatus comprising a central tower, a tiltable traveling support, an elevated sprinkling pipe under tension spanning and supported by said tower and support for swinging generally as a radius vector upon travel of the support generally in a desired curved path about the central tower, the tension in the pipe tending to tilt the support inward of said path toward the central support, means carried by the tiltable support tending to tilt the latter outward of said path to counterbalance the tension in the pipe, ground engaging wheels journaled on the support to carry the same upon tilting thereof inward of said path and biased to steer the support inward of said path, and ground engaging wheels journaled on the support to carry the same upon tilting thereof outward of said path and biased to steer the support outward of said path.

6. In a vehicle tiltable from side to side, a central support, elevated means spanning the central support and vehicle under tension, said means being pivotally connected to the support to swing about the latter as a radius vector and being also connected to an upper portion of the vehicle, thereby tending to tilt the latter inward toward the support, means tending to tilt the vehicle outward from the support and counterbalancing a predetermined tension in said elevated means, guide means to guide the vehicle generally in a curved path about said support including a ground engaging direction control wheel journaled on the vehicle on the side thereof adjacent the support, said wheel being journaled to roll in a direction to steer the vehicle inward of said path, and also including a second ground engaging direction control wheel journaled on the vehicle on the side thereof remote from said support, said second wheel being journaled to roll in a direction to steer the vehicle outward of said path.

7. In a wheeled vehicle tiltable from side to side, a central support, elevated means spanning the central support and vehicle under tension, said means being pivotally connected to the support to swing about the latter as a radius vector and being also connected to an upper portion of the vehicle, thereby tending to tilt the latter inward toward the support, means tending to tilt the vehicle outward from the support and counterbalancing a predetermined tension in said elevated means, guide means to guide the vehicle generally in a curved path about said support including a ground engaging front wheel journaled on the vehicle on the side thereof adjacent the support and directed inward of said path, and also including a second ground engaging front wheel journaled on the vehicle on the side thereof remote from said support and directed outward of said path.

References Cited in the file of this patent

UNITED STATES PATENTS

| Number | Name | Date |
|---|---|---|
| 690,762 | Papenfus | Jan. 7, 1902 |
| 1,108,528 | Todd et al. | Aug. 25, 1914 |
| 1,171,068 | Schienke | Feb. 8, 1916 |
| 1,197,534 | Norton | Sept. 5, 1916 |
| 2,097,840 | Olmsted | Nov. 2, 1937 |

FOREIGN PATENTS

| Number | Country | Date |
|---|---|---|
| 356,073 | Germany | July 12, 1922 |
| 451,813 | Great Britain | Aug. 12, 1936 |